US007171902B2

(12) United States Patent
Nouda

(10) Patent No.: US 7,171,902 B2
(45) **Date of Patent: *Feb. 6, 2007**

(54) DIRECT DRAWING LITHOGRAPHIC PRINTING PLATE MATERIAL

(75) Inventor: Junichi Nouda, Tokyo (JP)

(73) Assignee: Kimoto Co., Ltd., Tokyo (JP)

( * ) Notice: Subject to any disclaimer, the term of this patent is extended or adjusted under 35 U.S.C. 154(b) by 418 days.

This patent is subject to a terminal disclaimer.

(21) Appl. No.: 10/168,336

(22) PCT Filed: Dec. 21, 2000

(86) PCT No.: PCT/JP00/09095

§ 371 (c)(1),
(2), (4) Date: Jun. 20, 2002

(87) PCT Pub. No.: WO01/45959

PCT Pub. Date: Jun. 28, 2001

(65) Prior Publication Data

US 2003/0000408 A1 Jan. 2, 2003

(30) Foreign Application Priority Data

Dec. 22, 1999 (JP) ................................ 11-364168

(51) Int. Cl.
*B44N 1/00* (2006.01)
*B32B 5/16* (2006.01)
*B32B 9/04* (2006.01)

(52) U.S. Cl. ...................... 101/453; 101/460; 101/462; 428/323; 428/411.1

(58) Field of Classification Search ............ 428/32.11, 428/32.18, 32.25, 32.3, 32.34, 32.5, 323, 428/332, 33 T, 411.1; 430/11, 14, 18, 202; 101/453, 460, 462
See application file for complete search history.

(56) References Cited

U.S. PATENT DOCUMENTS 6,508,170 B2 * 1/2003 Katsuoka et al. ........... 101/455
6,555,291 B1 * 4/2003 Hauck ........................ 430/302
6,673,435 B1 * 1/2004 Tashiro et al. .............. 428/328

* cited by examiner

*Primary Examiner*—Sheeba Ahmed
(74) *Attorney, Agent, or Firm*—Bacon & Thomas, PLLC

(57) ABSTRACT

There is disclosed a direct drawing type lithographic printing plate material comprising a support and an image-forming layer formed on the support, wherein the image-forming layer is formed on a roughened surface of the support and contains a binder and a pigment having a relatively small particle size. The direct drawing type lithographic printing plate material of the present invention has extremely excellent water retention property and is capable of suppressing scumming upon printing, degradation of printing density and image blur even when the amount of a humidifying solution to be supplied is increased upon printing, and minimizes printing defects which otherwise occurs when a printing operation once stopped is resumed or the like.

4 Claims, 1 Drawing Sheet

DIRECT DRAWING LITHOGRAPHIC PRINTING PLATE MATERIAL

TECHNICAL FIELD

The present invention relates to a direct drawing type lithographic printing plate material, with which a printing plate can be directly made by a laser printer or the like. In particular, the present invention relates to a direct drawing type lithographic printing plate material that is excellent in water retention property.

BACKGROUND ART

Along with the recent widespread of electrophotographic printing equipment and laser printers, a direct drawing type lithographic printing plate material, with which a printing plate can be directly made by such equipment, is widely used in the light printing field.

Such a direct drawing type lithographic printing plate material adopts a structure that an image-forming layer having suitability to a humidifying solution (fountain solution) in offset printing is provided on a support such as paper or a plastic film.

In this image-forming layer, image portions formed by attaching a toner become lipophilic and carry a printing ink, while non-image portions become hydrophilic, carry a humidifying solution and repel the printing ink, thus enabling offset printing.

Therefore, the image-forming layer preferably has sufficient water retention property.

Meanwhile, when images are outputted to the direct drawing type lithographic printing plate material by an electrophotographic laser printer, scattering of the minute toner onto the non-image portions cannot be avoided, and an offset ink is attached to these portions upon printing and reproduced on the printed matter as printing scumming. In an actual printing work, such printing scumming can be prevented by increasing the amount of the humidifying solution to be supplied. However, since water retention property is not sufficient, that is a so-called "water allowance", which is a tolerance of the humidifying solution, is narrow in a conventional direct drawing type lithographic printing plate material, a problem arises that so-called "over-emulsification" such as lower printing density or image blur occurs when the amount of the humidifying solution to be supplied is increased.

Further, when a printing machine is once stopped, the surface of the plate material becomes dry. Therefore, at an initial stage after an operation of the printing machine is resumed, a printing ink is also impressed onto non-image portions. In this case, since water retention property is inferior in the conventional direct drawing type lithographic printing plate material, once impressed ink is hardly removed. Thus, it takes a long time from the time when supply of the humidifying solution is started to the time when contamination of a plate material is removed and, as a result, a large amount of defective printed matter is produced. Further, when the contamination is not removed, the plate needs to be replaced.

DISCLOSURE OF THE INVENTION

Accordingly, an object of the present invention is to provide a direct drawing type lithographic printing plate material that has sufficient water retention property and can overcome the aforementioned problems.

The inventors of the present invention assiduously studied in order to achieve the above object. As a result, they found that there was a close association between water retention property and the surface area of an image-forming layer. However, it was found that, when the surface area of the image-forming layer was increased simply by containing a pigment having a relatively large particle size in the image-forming layer, a satisfactory result could not be obtained because the surface state of the image-forming layer became ununiform, an image state outputted by a laser printer became rough, and a printing ink was impressed onto the pigment upon printing, resulting in scumming and so forth. Then, as a result of their further studies, they found that a direct drawing type lithographic printing plate material could be obtained with which the surface area of the image-forming layer was increased, water retention property was significantly improved, and the image state was not made rough and so forth when surface unevenness was formed by roughening the support surface and providing an image-forming layer containing a pigment having a relatively small particle size on the surface. Thus, they accomplished the present invention.

Accordingly, the present invention provides a direct drawing type lithographic printing plate material comprising a support and an image-forming layer formed on the support, wherein the image-forming layer is formed on a roughened surface of the support and contains a binder and a pigment having a relatively small particle size.

The pigment having a relatively small particle size contained in the image-forming layer of the direct drawing type lithographic printing plate material of the present invention preferably has an average particle size of smaller than 1 μm and is contained in an mount of 150–1000% by weight of the binder in the image-forming layer.

According to a preferred embodiment of the present invention, the support surface on which the image-forming layer is provided is roughened by forming an undercoat layer containing a binder and a pigment having a relatively large particle size. The pigment having a relatively large particle size contained in such an undercoat layer preferably has an average particle size of 2–15 μm and is contained in an amount of 5–50% by weight of the binder in the undercoat layer.

The roughened support surface preferably has surface roughness of 0.2–2.0 μm in terms of arithmetical mean deviation Ra (JIS-B0601), and the surface of the image-forming layer formed on the roughened support surface preferably has surface roughness of 0.3–1.0 μm in terms of arithmetical mean deviation Ra (JIS-B0601).

According to a specific preferred embodiment of the present invention, the direct drawing type lithographic printing plate material of the present invention has an undercoat layer containing a binder and a pigment having an average particle size of 2–15 μm and an image-forming layer containing a binder and a pigment having an average particle size of smaller than 1 μm successively provided on a support.

Further, in the aforementioned preferred embodiment of the direct drawing type lithographic printing plate material of the present invention, it is more preferable that the pigment having an average particle size of 2–15 μm is contained in the undercoat layer in the range of 5–50% by weight of the binder constituting the undercoat layer, and the pigment having an average particle size of smaller than 1 μm is contained in the image-forming layer in the range of 150–1000% by weight of the binder constituting the image-forming layer.

The direct drawing type lithographic printing plate material of the present invention has an image-forming layer whose surface area is significantly increased in comparison with a conventional one and is extremely excellent in water retention property. Consequently, scumming can be hardly generated. Further, since water retention property is improved, and the "water allowance" is widened, the problem of "overemulsification" such as lower printing density or image blur can be effectively prevented even when the amount of the humidifying solution to be supplied is increased upon printing. Further, even when the plate material surface is dry when a printing operation once stopped is resumed or the like, though the plate material surface is contaminated upon the resumption of printing, contamination of the inked surface is instantaneously removed when supply of the humidifying solution is resumed. Thus, printing defects are minimized and good printed matter can be obtained.

BEST MODE FOR CARRYING OUT THE INVENTION

Figure 1:
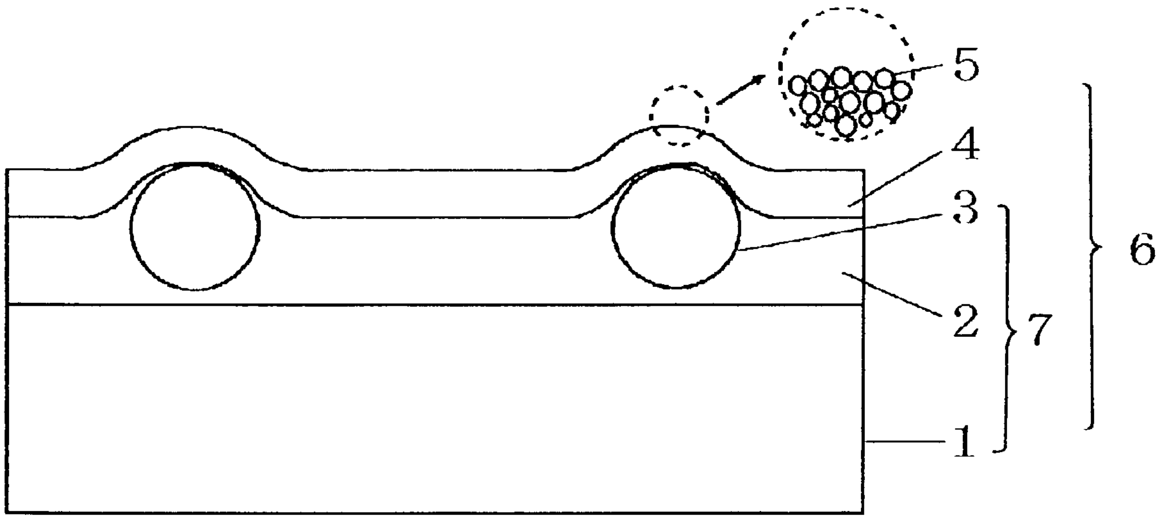
FIG. 1 is a schematic cross sectional view showing an example of the direct drawing type lithographic printing plate material of the present invention. A direct drawing type lithographic printing plate material 6 comprises a support 1, undercoat layer 2 and image-forming layer 4, and a support 7 having a roughened surface is composed of the support 1 and an undercoat layer 2 containing a pigment 3 having a relatively large particle size. The image-forming layer 4 contains a pigment 5 having a relatively small particle size.

Hereafter, the direct drawing type lithographic printing plate material of the present invention will be explained in detail.

As the support, a plastic film, synthetic paper and waterproof paper can be mentioned. The waterproof paper mentioned here refers to paper whose surface is coated with a water resistant agent such as a synthetic resin. The thickness of the support is not particularly limited, but one having a thickness of about 75–125 μm is preferably used. A support having such a thickness is excellent in operatability.

The surface of the support on which the image-forming layer is provided is roughened. The roughened support surface preferably has surface roughness of 0.2–2.0 μm, more preferably 0.4–1.2 μm in terms of arithmetical mean deviation Ra according to JIS-B0601.

The support having a roughened surface has relatively great unevenness on its roughened surface and mainly plays a role of imparting relatively great unevenness to the surface of the image-forming layer formed thereon.

The method for roughening the support surface is not particularly limited. For example, the support surface can be roughened by providing an undercoat layer containing a binder and a pigment having a relatively large particle size (hereinafter, referred to as "large-size pigment") thereon. Alternatively, the support surface can be roughened by treating the support surface by sandblasting, wherein an object surface is sprayed with fine sand at a high speed, embossing, wherein an object is passed between a metal engraving roll and an elastic roll, chemical etching, wherein an object surface is treated with a chemical agent and so forth. However, the support surface is preferably roughened by providing an undercoat layer containing a binder and a pigment having a relatively large particle size thereon.

The binder constituting the undercoat layer is not particularly limited, but a resin usually used for a film formed by coating can be used. Examples of the binder include polymers or copolymers such as vinyl acetate, vinyl chloride, styrene, butadiene, acrylic esters, methacrylic esters, ethylene and acrylonitrile, water-insoluble polymers such as silicone resins, polyester resins, polyurethane resins, alkyd resins and epoxy resins, water-soluble polymers such as polyvinyl alcohol, carboxymethyl cellulose, hydroxy ethyl cellulose, casein and gelatin, water-soluble polyurethane and so forth. Out of these, one kind or two or more kinds in combination can be used. In order to improve printing durability of the direct drawing type lithographic printing plate material, the binder constituting the undercoat layer preferably has good adhesion to the support and the binder constituting an image-forming layer described later.

The large-size pigment imparts relatively great unevenness to the surface of an image-forming layer provided on the undercoat layer by making the undercoat layer surface uneven as described above. The large-size pigment preferably has an average particle size of 2–15 μm, more preferably 2–10 μm. When the average particle size is 2 μm or larger, surface unevenness that can impart sufficient unevenness to the image-forming layer surface is obtained on the undercoat layer surface. When the average particle size is smaller than 15 μm, degradation of image quality and image concentration can be sufficiently prevented when a toner image is formed on the image-forming layer.

The material of the large-size pigment is not particularly limited, but inorganic or organic pigments can be used. Examples of the inorganic pigments include silica, clay, barium sulfate, alumina and so forth. Examples of the organic pigments include polymethyl methacrylate, polystyrene, polyurethane, benzoguanamine resins, silicone resins, cellulose acetate and so forth.

The content of the large-size pigment in the undercoat layer to the binder is preferably in the range of 5–50% by weight, more preferably 8–30% by weight to the binder. By using the large-size pigment in an amount of 5% by weight more to the binder, the undercoat layer surface can obtain surface unevenness that can impart sufficient unevenness to the image-forming layer surface. By using the large-size pigment in an amount of less than 50% by weight, brittleness of a coated film of the undercoat layer, degradation of printing durability due to adhesion to the support or the image-forming layer and so forth can be prevented.

The film thickness of the undercoat layer varies depending on the average particle size of the large-size pigment and the content of the large-size pigment to the binder, but is preferably in the range of 1–10 μm. When the thickness is made 1 μm or greater, the large-size pigment can be favorably carried. When the thickness is made less than 10 μm, degradation of the image concentration and adhesion of the toner image that occurs when a force for pulling a toner image from a back electrode upon output from a laser printer is relatively weakened in the image-forming layer surface can be prevented.

The roughness of the undercoat layer surface corresponds to the roughness of the roughened support surface and is preferable 0.2–2.0 μm, more preferably 0.4–1.2 μm in terms of arithmetical mean deviation Ra according to JIS-B0601.

The image-forming layer enables printing by attaching a toner and forming images so that lipophilic portions and hydrophilic portions should be formed on the image-forming layer surface. Specifically, image portions become lipophilic and carry a printing ink, while non-image portions become hydrophilic (after etching, become hydrophilic as required), carry a humidifying solution and repel the printing ink. Such an image-forming layer contains a binder and a pigment having a relatively small average particle size (hereinafter, referred to as "small-size pigment").

As the binder constituting the image-forming layer, resins usually used for forming a film by coating can be used without any particular limitation, and the same resins as those exemplified as the binder constituting the undercoat layer can be used. In order to improve printing durability, the binder constituting the image-forming layer preferably has good adhesion to the aforementioned binder constituting the undercoat layer.

The small-size pigment plays a role of increasing the surface area of the image-forming layer by further imparting fine unevenness to the uneven image-forming layer surface formed by the roughened support surface, for example, the uneven image-forming layer surface formed by the large-size pigment in the undercoat layer. When the surface area of the image-forming layer is thus increased, there is more room for the humidifying solution to enter, and hence water retention property can be improved.

The small-size pigment preferably has an average particle size of smaller than 1 μm, more preferably smaller than 0.2 μm. When the average particle size is smaller than 1 μm, the surface area of the image-forming layer can be sufficiently increased. The lower limit of the average particle size of the small-size pigment is not particularly limited, but about 0.005 μm is practically the lower limit in view of imparting of fine unevenness, production of the pigment and so forth.

The kind of the small-size pigment is not particularly limited, and the same kinds as those exemplified as the large-size pigment can be used. In particular, inorganic pigments such as zinc oxide, titanium oxide, silica, clay, kaoline, aluminum hydroxide and alumina, which are excellent in water absorptivity of pigment itself and can contribute to improvement of water retention property, can be preferably used. Besides the small-size pigment the image-forming layer may further contain a pigment having an average particle size 1 μm or larger to the extent that the aforementioned performance is not degraded.

The content of the small-size pigment to the binder in the image-forming layer is preferably in the range of 150–1000% by weight, more preferably 300–900% by weight to the binder. When the small-size pigment of 150% by weight or more to the binder is contained, the surface area of the image-forming layer can be sufficiently increased. When the content of the small-size pigment is 1000% by weight or less, degradation of printing durability due to brittleness of the coated film and the like can be prevented.

The film thickness of the image-forming layer is preferably in the range of 1–10 μm, more preferably 3–7 μm. When the thickness is 1 μm or greater, the small-size pigment can be favorably carried. The thickness of less than 10 μm can sufficiently prevent degradation of the image concentration and adhesion of the toner image that occurs when a force of pulling a toner image from a back electrode upon output from a laser printer is relatively weakened in the image-forming layer surface.

The surface roughness of the image-forming layer is preferably about 0.3–1.0 μm, more preferably about 0.4–0.8 μm in terms of arithmetical mean deviation Ra according to JIS-B0601. It is noted that this surface roughness of the image-forming layer does not represent roughness of fine unevenness formed by the small-size pigment. The Ra value measured for the image-forming layer surface substantially represents the surface roughness imparted to the image-forming layer by the roughened support surface. The fine unevenness formed by the small-size pigment does not substantially influence the Ra, but the fine unevenness improves water retention property.

The aforementioned undercoat layer and the image-forming layer may contain additives such as electric conduction agents, colorants, ultraviolet ray absorbers, leveling agents, surfactants and water resistant agents to the extent that the aforementioned performance is not degraded.

The undercoat layer and the image-forming layer having the aforementioned structure can be formed by applying and drying the undercoat layer and the image-forming layer made into a paint on the support by known coating methods such as the roll coating method, bar coating method, spray coating method and airknife coating method.

FIG. 1 is a schematic cross sectional view showing an example of the direct drawing type lithographic printing plate material of the present invention formed by using the support having a surface roughened by using the undercoat layer. A direct drawing type lithographic printing plate material 6 comprises a support 1 and an undercoat layer 2 and an image-forming layer 4 successively formed thereon. A support 7 having a roughened surface is composed of the support 1 and the undercoat layer 2 containing a pigment having a relatively large particle size 3. The image-forming layer 4 contains a pigment having a relatively small particle size 5. Consequently, the image-forming layer 4 surface has fine unevenness formed by the small-size pigment in the image-forming layer on the relatively great unevenness formed by the large-size pigment on the undercoat layer 2 surface.

In the direct drawing type lithographic printing plate material of the present invention adopting the structure as described above, not only unevenness is imparted to the image-forming layer surface by the unevenness of the roughened surface, for example, the great unevenness formed on the undercoat layer surface, but also fine unevenness can be further imparted by the pigment having a small particle size contained in the image-forming layer. Consequently, the surface area of the image-forming layer is significantly increased in comparison with a conventional product, and thus a direct drawing type lithographic printing plate material having extremely excellent water retention property can be obtained.

Thus, scumming can be hardly generated due to improvement of water retention property. Further, since water retention property is improved, that is, the "water allowance", which is tolerance of the humidifying solution, is sufficiently made large, the problems of "overemulsification" such as degradation of printing density or image blur can be effectively prevented even when the amount of the humidifying solution to be supplied is increased upon printing. Further, even when the plate material surface is dry when a printing operation once stopped is resumed or the like, though the plate material surface is contaminated upon the resumption of printing, contamination of the inked surface is instantaneously removed when supply of the humidifying solution is started, since the plate material surface has large room for the humidifying solution to enter, and hence printing defects are minimized. Further, while the printing operator should pay close attention to a finishing state of printed matter depending on the humidification amount during an operation of a printing machine, concerns of the printing operator about the humidification amount can be reduced since some change in the humidification amount does not influence the finish of printing due to the widened "water allowance".

Meanwhile, it is considered that the surface area can also be increased by directly providing an image-forming layer containing both a small-size pigment and a large-size pigment on the support. However, since the image-forming layer surface becomes ununiform due to the influence of the large-size pigment, an image outputted by a laser printer becomes rough. Further, a printing ink is impressed onto the large-size pigment exposed on the image-forming layer surface, and hence printing scumming is easily generated. Such problems can be solved by the direct drawing type lithographic printing plate material of the present invention.

EXAMPLES

Hereafter, the present invention will be explained more specifically with reference to the following examples. However, the scope of the present invention is not limited to these examples. In the following examples, "part" and "%" are used on a weight basis unless otherwise indicated.

Example 1

On a support 1 made of a polyester film having a thickness of 100 μm (Lumirror S14: Toray Industries, Inc.), an undercoat layer 2 was formed by applying a coating solution for an undercoat layer having the following composition by the bar coating method so that the coated layer should have a dry film thickness of 5 μm.

| <Coating solution for undercoat layer> | |
|---|---|
| Polyester resin (solid content: 100%, Elitel UE3201, Unitika, Ltd.) | 25 parts |
| Isocyanate prepolymer (solid content: 60%, Takenate D110N, Takeda Chemical Industries, Ltd.) | 5 parts |
| Methyl ethyl ketone | 105 parts |
| Toluene | 105 parts |
| Large-size pigment (average particle size: 6 μm, Sylysia 770, Fuji Silysia Chemical Ltd.) | 2 parts |

The surface roughness of the formed undercoat layer 2 was 0.55 μm in terms of arithmetical mean deviation Ra according to JIS-B0601 when measured by using a surface roughness measuring instrument SE-3C manufactured by Kosaka Laboratory Ltd. Subsequently, a coating solution for an image-forming layer having the following composition was applied and dried on the undercoat layer 2 to form an image-forming layer 4 having a thickness of 7 μm. Thus, a direct drawing type lithographic printing plate material 6 was obtained.

| <Coating solution for image-forming layer> | |
|---|---|
| Polyvinyl alcohol (10% aqueous solution, Kuraray Poval 117: Kuraray Co., Ltd.) | 100 parts |
| Glyoxal (40% aqueous solution, Wako Pure Chemical Industries, Ltd.) | 8 parts |
| Water | 62 parts |
| Isopropyl alcohol | 20 parts |
| Small-size pigment (Titanium dioxide, average particle size: 0.12 μm, FA-50: FURUKAWA CO., LTD.) | 30 parts |

The surface roughness of the image-forming layer surface of the direct drawing type lithographic printing plate material of the present invention formed as described above was 0.32 μm in terms of arithmetical mean deviation Ra according to JIS-B0601 when measured by using a surface roughness measuring instrument SE-3C manufactured by Kosaka Laboratory Ltd.

Example 2

A direct drawing type lithographic printing plate material 6 was obtained in the same manner as in Example 1 except that the content of the large-size pigment in the coating solution for an undercoat layer in Example 1 was changed to 5 parts.

The surface roughness of the undercoat layer surface and that of the image-forming layer surface of the direct drawing type lithographic printing plate material of the present invention formed as described above were 1.01 μm and 0.42 μm, respectively, in terms of arithmetical mean deviation Ra according to JIS-B0601 when measured in the same manner as in Example 1.

Example 3

A direct drawing type lithographic printing plate material 6 was obtained in the same manner as in Example 1 except that the content of the large-size pigment in the coating solution for an undercoat layer in Example 1 was changed to 10 parts.

The surface roughness of the undercoat layer surface and that of the image-forming layer surface of the direct drawing type lithographic printing plate material of the present invention formed as described above were 1.71 μm and 0.57 μm, respectively, in terms of arithmetical mean deviation Ra according to JIS-B0601 when measured in the same manner as in Example 1.

Example 4

A direct drawing type lithographic printing plate material 6 was obtained in the same manner as in Example 1 except that, as the large-size pigment in the coating solution for an undercoat layer in Example 1, 10 parts of silica having an average particle size of 2.5 μm (Sylysia 430: Fuji Silysia Chemical Ltd.) was used.

The surface roughness of the undercoat layer surface and that of the image-forming layer surface of the direct drawing type lithographic printing plate material of the present invention formed as described above were 1.01 μm and 0.70 μm, respectively, in terms of arithmetical mean deviation Ra according to JIS-B0601 when measured in the same manner as in Example 1.

Comparative Example 1

On a support 1 made of a polyester film having a thickness of 100 μm (Lumirror S14: Toray Industries, Inc.), an undercoat layer was formed by applying a coating solution for an undercoat layer having the following composition by the bar coating method so that the coated layer should have a dry film thickness of 5 μm.

| <Coating solution for undercoat layer> | |
|---|---|
| Polyester resin (solid content: 100%, Elitel UE3201: Unichika, Ltd.) | 25 parts |
| Isocyanate prepolymer (solid content: 60%, akenate D110N: Takeda Chemical Industries, Ltd.) | 5 parts |
| Methyl ethyl ketone | 105 parts |
| Toluene | 105 parts |

The surface roughness of the formed undercoat layer 2 was 0.07 μm in terms of arithmetical mean deviation Ra according to JIS-B0601 when measured in the same manner as in Example 1. Subsequently, the coating solution for an image-forming layer of Example 1 was applied and dried on the undercoat layer 2 to form an image-forming layer 4 having a thickness of 7 μm. Thus, a direct drawing type lithographic printing plate material was obtained.

The surface roughness of the image-forming layer surface of the direct drawing type lithographic printing plate material of the present invention formed as described above was 0.13 μm in terms of arithmetical mean deviation Ra according to JIS-B0601 when measured in the same manner as in Example 1.

Comparative Example 2

On a support 1 made of a polyester film having a thickness of 100 μm (Lumirror S14: Toray Industries, Inc.), the same undercoat layer as that in Comparative Example 1 was formed, and then a coating solution for an image-forming layer having the following composition was applied and dried on the undercoat layer to form an image-forming layer having a thickness of 7 μm. Thus, a direct drawing type lithographic printing plate material was obtained.

| <Coating solution for image-forming layer> | |
|---|---|
| Polyvinyl alcohol (10% aqueous solution, Kuraray Poval 117: Kuraray) | 100 parts |
| Glyoxal (40% aqueous solution, Wako Pure Chemical Industries, Ltd.) | 8 parts |
| Water | 62 parts |
| Isopropyl alcohol | 20 parts |
| Small-size pigment (Titanium dioxide, average particle size: 0.12 μm, FA-50: FURUKAWA CO., LTD.) | 30 parts |
| Large-size pigment (average particle size: 6 μm, Sylysia 770: Fuji Silysia Chemical Ltd.) | 2 parts |

The surface roughness of the undercoat layer surface and that of the image-forming layer surface of the direct drawing type lithographic printing plate material of the present invention formed as described above were 0.07 μm and 0.53 μm, respectively, in terms of arithmetical mean deviation Ra according to JIS-B0601 when measured in the same manner as in Example 1.

Images were formed on the direct drawing type lithographic printing plate materials obtained in the examples and comparative examples by a laser printer (Esper Laser LP-8400: Seiko Epson Corp.), and each direct drawing type lithographic printing plate material on which images were formed was mounted onto an offset printing machine (RYOBI3200ACD: Ryobi Ltd.), and printing was performed.

Printing was performed by using a slowly drying offset ink (BSD New Rubber Base Ink: Bunshodo Corp.) at 20° C. in 50% RH. As the humidifying solution, the etchant (Nikken PP Clean H: Nikken Chemicals Co., Ltd.) diluted 30 times with water was used, and printing was performed on 5000 sheets of woodfree paper at a printing speed of 5500 sheets/hr.

Scumming and printing durability of the 5000th sheet of the printed matter were evaluated. Further, evaluation was also performed on the water allowance that could achieve the printed matter at a proper printing density and the recovery speed at which an inked surface was recovered from contamination when a printing machine was once stopped and then the printing machine was resumed with the dry inked surface.

(1) Scumming

Presence or absence of scumming in non-image portions of the printed matter was observed by using an inverted metal microscope (PME3: Olympus Optical Co., Ltd.), and the number of scumming sites having a particle size of 10 μm or larger per 1 $mm^2$ was counted. When less than 5 sites were observed, "o" was given. When 5 or more and less than 10 sites were observed, "Δ" was given. When 10 or more sites are observed, "x" was given.

(2) Printing Durability

Presence or absence of omissions of 5% halftone dot (80 lines/inch) images was evaluated. Evaluation was visually performed for omissions of images of 1 square inch. When less than 5 omissions were observed, "o" was given. When 5 or more omissions were observed, "x" was given. It is noted that 1 inch is 2.54 cm.

(3) Water Allowance

While it was regarded as the optimal conditions of the printed matter that the whole surface of the plate material was not contaminated and that the reflection density of the solid image was 1.40 or higher, the range of the humidification scale of a printing machine satisfying these optimal conditions was regarded as the water allowance.

(4) Recovery Speed

The humidification scale of the printing machine was set to be 0, and an ink was impressed onto the whole inked surface and the supply of the humidifying solution was resumed. Then, the number of rotations of the plate cylinder of the printing machine required to recover the inked surface from contamination was measured.

TABLE 1

| | Scumming | Printing durability | Allowable range of water content | Recovery speed |
|---|---|---|---|---|
| Example 1 | o | o | 2–3.5 | 20 rotations |
| Example 2 | o | o | 1–4 | 10–15 rotations |
| Example 3 | o | o | 1–4 | 10–15 rotations |
| Example 4 | o | o | 1–3.5 | 10–15 rotations |
| Comparative Example 1 | Δ | o | 2–3 | 30 rotations |
| Comparative Example 2 | X | x | 2–4 | Not recovered with 40 rotations |

As shown in Table 1, since the plate materials of the present invention in the examples adopt a structure where the image-forming layer 4 containing the small-size pigment 5 is provided on the undercoat layer 2 containing the large-size pigment 3, their water allowance were wide in comparison with those of the comparative examples, that is, these plate materials had good water retention property. Due to this good water retention property, scumming hardly occurred, and the recovery speed was also good. Further, printing durability, which is another required performance of a direct drawing type lithographic printing plate material 6, was also excellent.

Since the plate material of Example 1 had the undercoat layer 2 containing the large-size pigment 3 in an amount a little less than the optimal value, less surface unevenness was formed on the image-forming layer 4, and the water allowance (water retention property) was a little inferior in comparison with the plate materials of Examples 2–4.

In the plate material of Examples 2–4, since the contents of the large-size pigment 3 in the undercoat layer 2 and the small-size pigment 5 in the image-forming layer 4 were within the optimal range, the water allowance was wide (good water retention property), and hence scumming hardly occurred, and good recovery speed was exhibited.

Since the plate material of Comparative Example 1 did not contain a large-size pigment in the undercoat layer, the image-forming layer surface was nearly smooth, the water retention property of the image-forming layer was insufficient, and the water allowance was narrow. Further, due to the insufficient water retention property, scumming was conspicuous and the recovery speed was inferior in comparison with the plate materials of the examples.

The plate material of Comparative Example 2 contained the small-size pigment and the large-size pigment mixed in the image-forming layer, roughness of the image-forming layer surface was comparable to that of the plate materials of the present invention. However, since the large amount of the large-size pigment was contained in the image-forming layer, which is a surface layer, in order to obtain such roughness, the image-forming layer had an ununiform surface, and the image state outputted by the laser printer became rough. Further, a printing ink was impressed onto the large-size pigment exposed on the image-forming layer surface, and hence scumming was very conspicuous.

What is claimed is:

1. A direct drawing type lithographic printing plate material comprising a support with a roughened surface and an image-forming layer formed on the support, wherein the image-forming layer is formed on the roughened surface of the support and contains a binder and a pigment having an average particle size smaller than the surface roughness (Ra) of the support, wherein the pigment is contained in the image-forming layer in an amount of 150–1000% by weight of the binder in the image-forming layer.

2. The direct drawing type lithographic printed plate according to claim 1 wherein the amount of pigment is 300–900% by weight of the binder.

3. The direct drawing type lithographic printed plate material according to claim 1 wherein the pigment has an average particle size smaller than 0.2 μm.

4. The direct drawing type lithographic printing plate material according to claim 3, wherein the image-forming layer surface has a surface roughness of 0.3–1.0 μm in terms of arithmetical mean deviation Ra (JIS-B0601).

* * * * *